United States Patent
Mallaghan (10) Patent No.: US 9,174,805 B2
(45) Date of Patent: Nov. 3, 2015

(54) CONVEYOR APPARATUS FOR LOADING AND UNLOADING AN AIRCRAFT

(75) Inventor: Ronan Mallaghan, Tyrone (GB)

(73) Assignee: Mallaghan Engineering Ltd., Tyrone (GB)

(*) Notice: Subject to any disclaimer, the term of this patent is extended or adjusted under 35 U.S.C. 154(b) by 0 days.

(21) Appl. No.: 13/807,165

(22) PCT Filed: Jun. 24, 2011

(86) PCT No.: PCT/EP2011/060653
§ 371 (c)(1),
(2), (4) Date: Jan. 16, 2013

(87) PCT Pub. No.: WO2012/000908
PCT Pub. Date: Jan. 5, 2012

(65) Prior Publication Data
US 2013/0118864 A1 May 16, 2013

(30) Foreign Application Priority Data

Jun. 30, 2010 (GB) .................................. 1010997.3
Apr. 4, 2011 (GB) .................................. 1105638.9

(51) Int. Cl.
*B64F 1/32* (2006.01)
*B65G 37/00* (2006.01)
(Continued)

(52) U.S. Cl.
CPC . *B65G 37/00* (2013.01); *B64F 1/32* (2013.01); *B65G 21/14* (2013.01); *B65G 41/005* (2013.01); *B65G 67/08* (2013.01)

(58) Field of Classification Search
CPC ........... B65G 2814/0398; B65G 15/22; B65G 15/10; B65G 67/08; B65G 41/005; B60P 1/00; B64F 1/32

USPC ................................... 414/344, 345; 198/511
See application file for complete search history.

(56) References Cited

U.S. PATENT DOCUMENTS

| 3,066,817 A | 12/1962 | Bradshaw et al. |
| 3,524,558 A * | 8/1970 | Mastracci et al. ............ 414/345 |

(Continued)

FOREIGN PATENT DOCUMENTS

| EP | 336940 B1 | 9/1992 |
| EP | 1248726 A1 | 7/2001 |
| WO | 2006042503 A1 | 4/2006 |

OTHER PUBLICATIONS

International Search Report of the International Searching Authority, mailed Oct. 10, 2011, from corresponding Patent Cooperation Treaty (PCT) Application No. PCT/EP2011/060653.

*Primary Examiner* — Gene Crawford
*Assistant Examiner* — Thomas Randazzo
(74) *Attorney, Agent, or Firm* — Gardner, Linn, Burkhart & Flory, LLP (57) ABSTRACT

A conveyor apparatus for loading and unloading aircraft, the apparatus comprising a first conveyor for conveying articles from an area outside of an aircraft to an entrance to a cargo compartment of the aircraft, and a second conveyor for conveying articles from an end of the first conveyor into the cargo compartment, the second conveyor being telescopically extendable from the first conveyor, wherein the second conveyor comprises an endless flexible member extending between a tail end of the second conveyor adjacent the first conveyor and a head end of the second conveyor segment at a distal end of the second conveyor, and a driver for driving the endless member to convey articles along the second conveyor.

12 Claims, 6 Drawing Sheets

(51) Int. Cl.
  *B65G 21/14* (2006.01)
  *B65G 41/00* (2006.01)
  *B65G 67/08* (2006.01)

(56) References Cited

U.S. PATENT DOCUMENTS

| | | | |
|---|---|---|---|
| 3,837,508 A * | 9/1974 | Stefanelli | 414/510 |
| 4,287,983 A * | 9/1981 | Bronsveld | 198/817 |
| 4,351,429 A * | 9/1982 | Garvey | 198/690.2 |
| 5,351,809 A | 10/1994 | Gilmore et al. | |
| 5,796,052 A * | 8/1998 | Christmann | 177/145 |
| 6,006,893 A * | 12/1999 | Gilmore et al. | 198/588 |
| 6,481,563 B1 * | 11/2002 | Gilmore | 198/511 |
| 6,823,985 B2 * | 11/2004 | Gilmore et al. | 198/588 |
| 6,893,200 B2 * | 5/2005 | Thøgersen | 414/345 |
| 7,004,308 B2 * | 2/2006 | Parks et al. | 198/812 |
| 7,033,125 B2 * | 4/2006 | Thogersen | 414/345 |
| 7,077,615 B2 * | 7/2006 | Thogersen et al. | 414/346 |
| 7,108,125 B2 * | 9/2006 | Gilmore et al. | 198/812 |
| 7,156,604 B2 * | 1/2007 | Thogersen | 414/345 |
| 7,513,354 B1 * | 4/2009 | Canapa | 198/312 |
| 8,562,276 B2 * | 10/2013 | Helmner | 414/345 |
| 2003/0049107 A1 * | 3/2003 | Thogersen | 414/398 |
| 2005/0279616 A1 * | 12/2005 | Pogue | 198/812 |
| 2008/0232941 A1 * | 9/2008 | Van Den Goor et al. | 414/335 |
| 2009/0294246 A1 * | 12/2009 | Pogue | 198/313 |

* cited by examiner

CONVEYOR APPARATUS FOR LOADING AND UNLOADING AN AIRCRAFT

FIELD OF THE INVENTION

This invention relates to a conveyor apparatus for loading and unloading an aircraft.

BACKGROUND OF THE INVENTION

A critical process in the operation of aircraft is the loading and unloading of passengers' luggage from the cargo hold of the aircraft. Tight operating schedules place great demands on the efficient and rapid loading and unloading of luggage into and from the cargo hold. It is common to utilise height adjustable and tiltable endless belt conveyors to convey luggage between a ground level and the entrance to a cargo hold of an aircraft, which may be positioned at a considerable height above the ground. However, once the luggage is delivered into the cargo hold by such conveyors it is normally necessary for the luggage to be manually handled within the luggage compartment, requiring baggage handlers to enter the cargo hold and carry out manual lifting and moving of the luggage delivered from the conveyor, often in confined spaces. This requires the person to lift luggage from the conveyor at the opening of the cargo hold, leading to a risk of injury should the person accidentally fall from the opening.

The conveyor apparatus disclosed in EP 1 248 726 attempts to address this problem by providing a second conveyor extendable from the end of the main conveyor to enter into the cargo hold of the aircraft, the second conveyor including a succession of individual conveyor units, each having a short endless belt conveyor with its own drive system, the conveyor units being coupled together by coupling members permitting sideways pivotal movement of the second conveyor so that it can extend into the cargo hold in an arcuate manner whereby the end of the conveyor can be located at any desired position within the cargo hold, obviating the need to manually lift and carry luggage around within the cargo hold.

However, the use of a succession of individual conveyor units, each requiring its own drive means and power coupling, creates a complex and costly arrangement. Moreover, the failure of just one of the several individual conveyor units will disable the entire conveyor apparatus.

SUMMARY OF THE INVENTION

The present invention provides a conveyor apparatus for loading and unloading aircraft, the apparatus having a first conveyor for conveying articles from an area outside of an aircraft to an entrance to a cargo compartment of the aircraft and a second conveyor for conveying articles from an end of the first conveyor into the cargo compartment, the second conveyor being telescopically extendable from the first conveyor. The second conveyor includes a plurality of conveyor segments mutually interconnected by a coupler or coupling means permitting mutual sideways pivotal movement of the conveyor segments defining an adjustable conveyor path, wherein the second conveyor includes an endless flexible member extending between a tail end of the second conveyor adjacent the first conveyor and a head end of the second conveyor segment at a distal end of the second conveyor, and a driver or drive means driving the endless member to convey articles along the second conveyor. The drive means may be provided on at least one end of the second conveyor. Optionally, the drive means is provided at least on the head end of the second conveyor. In one embodiment a first drive means may be provided on the head end of the second conveyor for driving the conveyor in a first direction, a further drive means being provided at a tail end of the second conveyor for driving the conveyer in a second direction, opposite the first direction.

The coupling means may be adapted to enable the articulation of adjacent conveyor segments in both a horizontal and a vertical plane to permit sideways and upwards and downwards mutual articulation between adjacent conveyor segments.

In one embodiment the endless member includes a drive chain, belt or band extending between sprockets or pulleys mounted on the respective head and tail ends of the second conveyor. Optionally, the endless member extends along a central axis of the second conveyor coincident with the coupling means of each of the conveyor segments. A guide or guide means may be provided on each segment of the second conveyor for guiding the path of the chain.

Optionally, a plurality of conveyor flights are mounted on the endless member to be moved along the conveyor segments, each conveyor flight including a central portion coupled to the endless member and pair of opposing side wings extending transversely from the endless member to define a respective portion of a conveying surface. Optionally, the side wings taper from the central portion to a respective distal end thereof to permit mutual sideways pivotal movement of the conveyor segments. Optionally, the central portion is guided for movement within a channel or slot provided in each conveyor segment.

In one embodiment each conveyor segment includes a driven member, such as a sprocket, engaging the endless member, at least one roller or wheel being driven by the driven member for rotation about an axis extending transverse to the second conveyor for conveying articles along the second conveyor.

Optionally, each conveyor segment is provided with at least one ground engaging support wheel or roller on a lower side thereof.

In one embodiment the coupling means includes a ball and socket joint provided between mutually interconnected conveyor segments. Alternatively the coupling means may include a universal joint, such as a cardan joint. A central channel may be provided through each conveyor segment and through the coupling means through which may extend cables or wires. The channel may be defined by a flexible tubular member in the region of the coupling means, for example in the form of a coil spring.

According to a further aspect of the present invention there is provided a conveyor apparatus for loading and unloading aircraft, the apparatus having a first conveyor for conveying articles from an area outside of an aircraft to an entrance to a cargo compartment of the aircraft and a second conveyor for conveying articles from an end of the first conveyor into the cargo compartment, the second conveyor being telescopically extendable from the first conveyor, wherein the second conveyor includes a plurality of conveyor segments mutually interconnected by coupling means permitting mutual sideways pivotal movement of the conveyor segments defining an adjustable conveyor path, wherein the second conveyor is provided with a single conveyor or conveying means to convey articles therealong, such as in the form of an endless belt or chain.

According to a further aspect of the present invention, there is provided a conveyor apparatus for loading and unloading aircraft, the apparatus including a first conveyor for conveying articles from an area outside of an aircraft to an entrance to a cargo compartment of the aircraft and a second conveyor for conveying articles from an end of the first conveyor into the cargo compartment, the second conveyor being telescopically extendable from the first conveyor, wherein the second conveyor includes a plurality of conveyor segments mutually interconnected by coupling means permitting mutual sideways pivotal movement of the conveyor segments defining an adjustable conveyor path, wherein the second conveyor is provided with a single drive means to convey articles therealong.

Embodiments of the present invention will now be described, by way of example only, with reference to the accompanying drawings.

DESCRIPTION OF THE PREFERRED EMBODIMENTS

Figures 1, 2, 3:
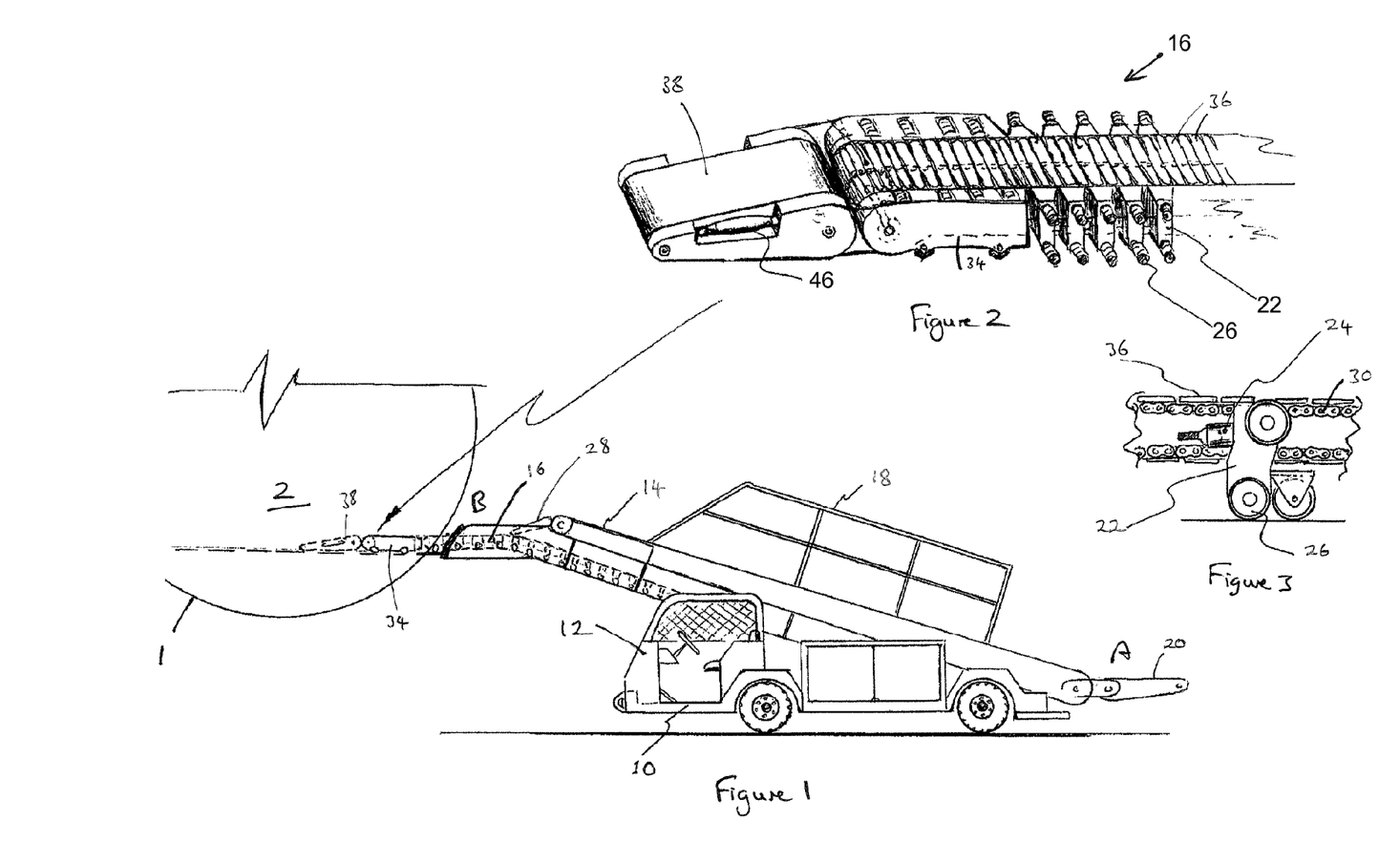
FIG. 1 is a side view of a conveyor apparatus according to a first embodiment of the present invention.
FIG. 2 is a detailed perspective view of a head end of the conveyor apparatus of FIG. 1.
FIG. 3 is a longitudinal sectional view through a portion of the conveyor apparatus of FIG. 1.

As shown in FIG. 1, a conveyor apparatus according to an embodiment of the present invention includes a vehicle 10 having a forward operator cab 12, a first endless belt conveyor 14 being mounted on the vehicle 10 for conveying luggage from a lower position A at the rear end of the vehicle 10 to a raised position B at forward end of the vehicle 10 for conveying luggage into and out of the opening of a cargo hold 2 of an aircraft 1. As is conventional in the art, the first conveyor 14 is mounted on the vehicle 10 such that the angle of inclination of the conveyor 14 and the height of the upper or head end of the conveyor 14 can be adjusted to suit the height of the opening of the cargo hold 2 of the aircraft 1. Hand rails 18 are provided on either side of the first conveyor 14.

A second conveyor 16 is telescopically extendable from below the first conveyor 14 to extend into the cargo hold 2 of the aircraft 1 from the head end of the first conveyor 14, such that the first and second conveyors 14, 16 form a substantially uninterrupted conveyor path between the tail end of the first conveyor and a head end of the second conveyor 16.

A further belt conveyor 20 is pivotally mounted on a tail end of the first conveyor 14, the further conveyor 20 being generally arranged substantially horizontally for loading and unloading luggage on and off the conveyor apparatus at ground level.

The second conveyor 16 includes a plurality of mutually interconnected conveyor segments 22 connected together by means of ball and socket or knuckle joints 24 whereby the conveyor segments 22 of the second conveyor 16 may be pivotally displaced sideways and upwards and downwards with respect to each other to adjust the conveyor path of the second conveyor 16 as required, such that the head end of the second conveyor 16 is positionable at a position wherein the luggage conveyed therein is desired to be placed. Each conveyor segment 22 is provided with support rollers 26 on the base thereof (FIGS. 3-6) to allow the segments 22 of the second conveyor 16 to be rolled out along the floor of the cargo hold 2 of the aircraft and moved around therein as required to locate the head end of the second conveyor 16 at a desired location in the cargo hold. The second conveyor 16 may be of sufficient length to reach into the furthest point away from the opening of the cargo hold when fully extended from the first conveyor 14. The length of the conveyor 16 may be selected to suit the size of the cargo hold of the largest aircraft with which the conveyor apparatus is to be used.

An intermediate conveyor section 28 is journaled on the head end of the first conveyor 14 to be pivotable about a horizontal axis extending transverse to the first conveyor 16, the intermediate conveyor section 28 bridging a gap between the first and second conveyors 14, 16 for smoothly transferring articles between the second conveyor 16 and the first conveyor 14. The intermediate conveyor section 28 may include a belt conveyor, or may include a simple ramp, or may include a series of parallel rollers, for example.

In the illustrated embodiment, the second conveyor 16 includes an endless drive chain 30 (FIGS. 3-6) extending around the plurality of conveyor segments 22 between a first sprocket 32 mounted on a head section 34 of the second conveyor 16, and a second sprocket (not shown) mounted at a tail end of the second conveyor 16. A first drive motor may be mounted within a head section 34 of the second conveyor 16 for driving the chain 30 in a first direction. The drive motor is preferably an electric motor, although other types of drive motor may be used, such as a hydraulic motor. A second drive motor may be provided at a tail end of the second conveyor for driving the chain in a second direction, opposite the first direction. For example, the first drive motor may be used to drive the second conveyor in a loading direction for delivering luggage into a luggage hold of an aircraft and the second drive motor may be used to drive the second conveyor in an unloading direction for unloading luggage from the luggage hold.

A plurality of transversely extending conveyor flights 36 (FIGS. 3-6) are mounted on the chain 30 to define a moveable conveying surface. Each flight 36 includes a central portion and a pair of opposing wing portions. The sides of the wing portions are tapered from the central portion to the respective distal ends thereof to provide sufficient clearance between adjacent conveyor flights to permit sideways displacement of the segments 22 of the second conveyor 16, as will be described below in more detail. The chain 30, or at least the central portion of each conveyor flight mounted on the chain, is guided through channels 31 formed in each segment 22 of the second conveyor 16. Such channels 31 may be formed from or lined with a hard wearing low friction material, such as a polymeric material, such as polyethylene. As shown in FIG. 5, a channel is defined in each conveyor segment 22 above the support rollers 26 through which the lower run of the conveyor surface defined by the conveyor flights 36 may pass.

A further belt conveyor section 38 may be mounted on the head section 34 of the second conveyor 16 for delivering luggage onto and off the head section 34 of the second conveyor 16, such as shown in FIGS. 1 and 2.

Figure 4:
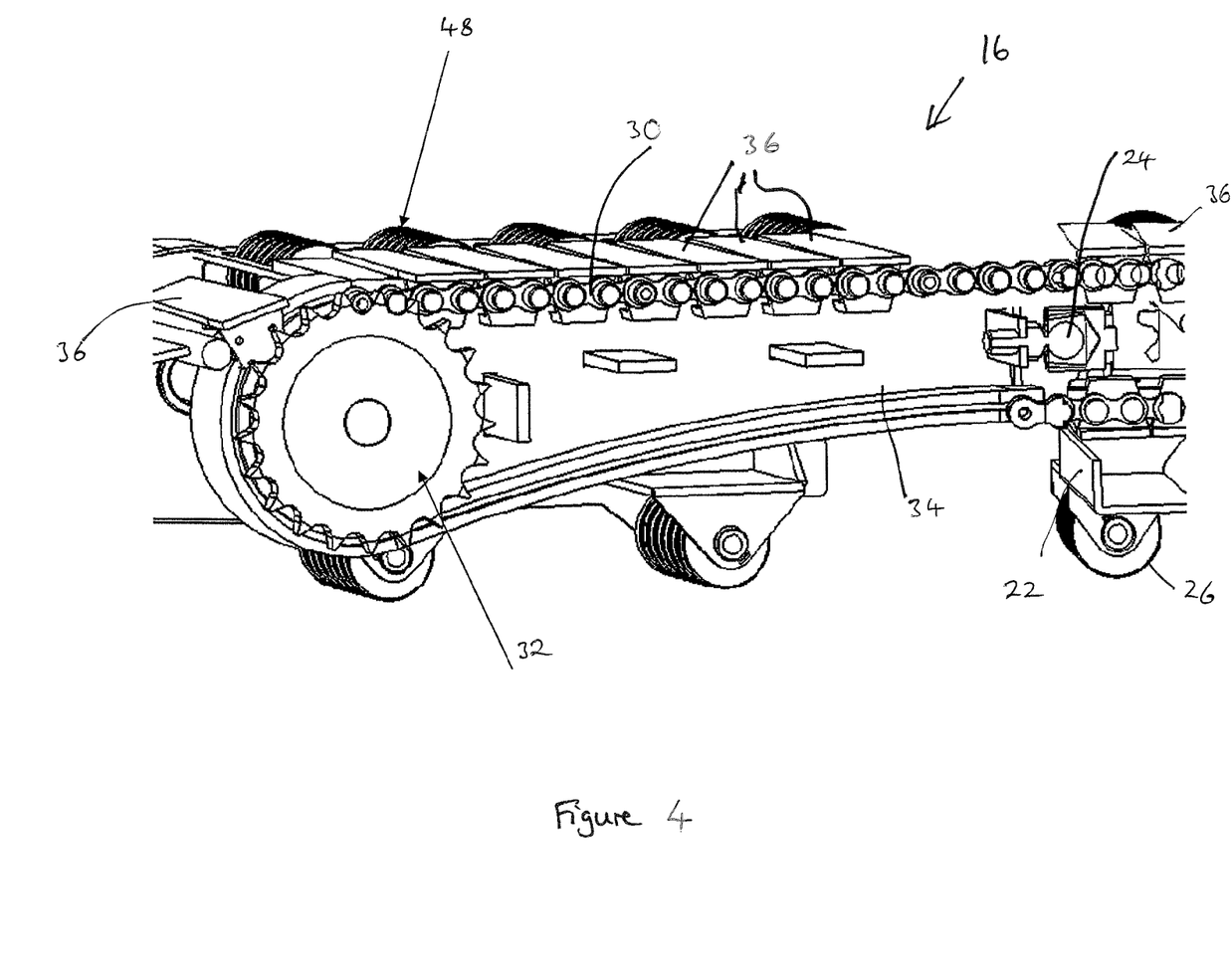
FIG. 4 is a longitudinal sectional view through the head section of the conveyor apparatus of FIG. 1.
Figure 5:
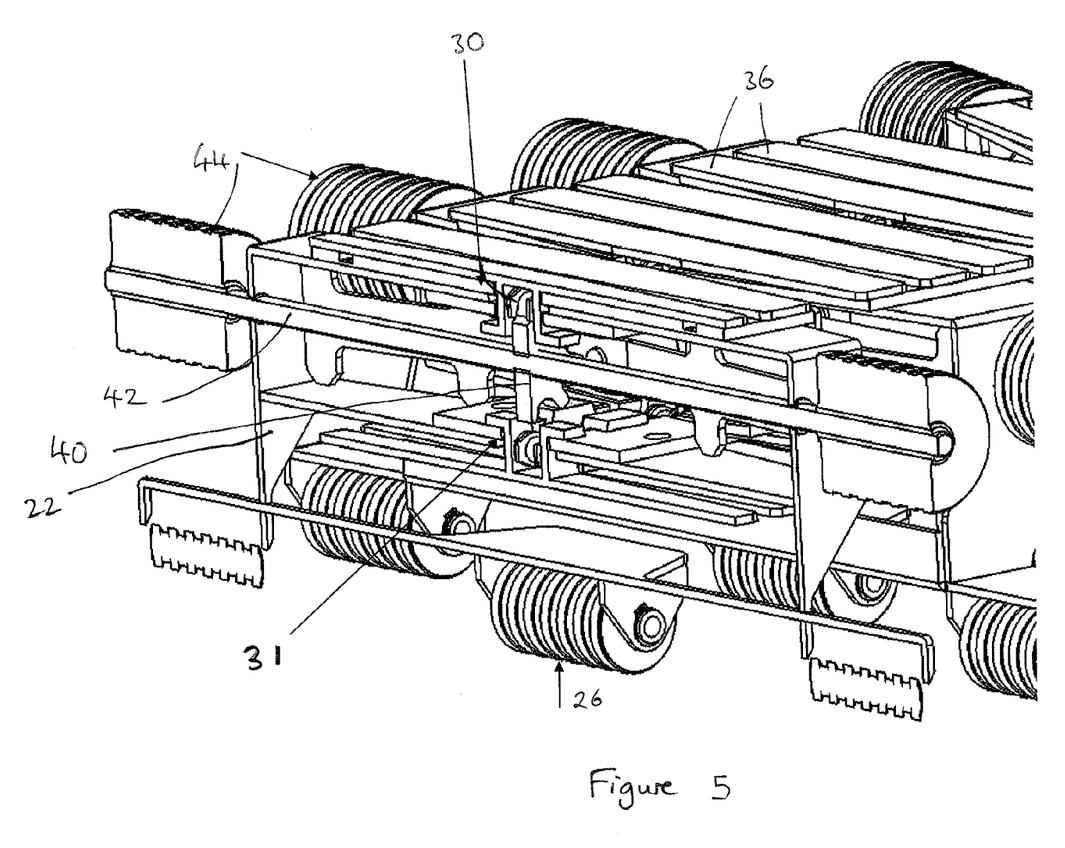
FIG. 5 is a transverse sectional view through the second conveyor of the conveyor apparatus of FIG. 1.

A shown in FIGS. 2 and 4, the head section 34 of the second conveyor may be provided with freely rotating idler rollers 48 on either side of the conveyor flights 36.

Handles may be provided on the head end of the second conveyor 16 to enable it to be moved into position within the cargo hold of an aircraft. In the embodiment shown, handles 46 are provided on either side of the conveyor section 38 mounted on the head section 34 of the second conveyor 16 (FIG. 2).

Figure 6:
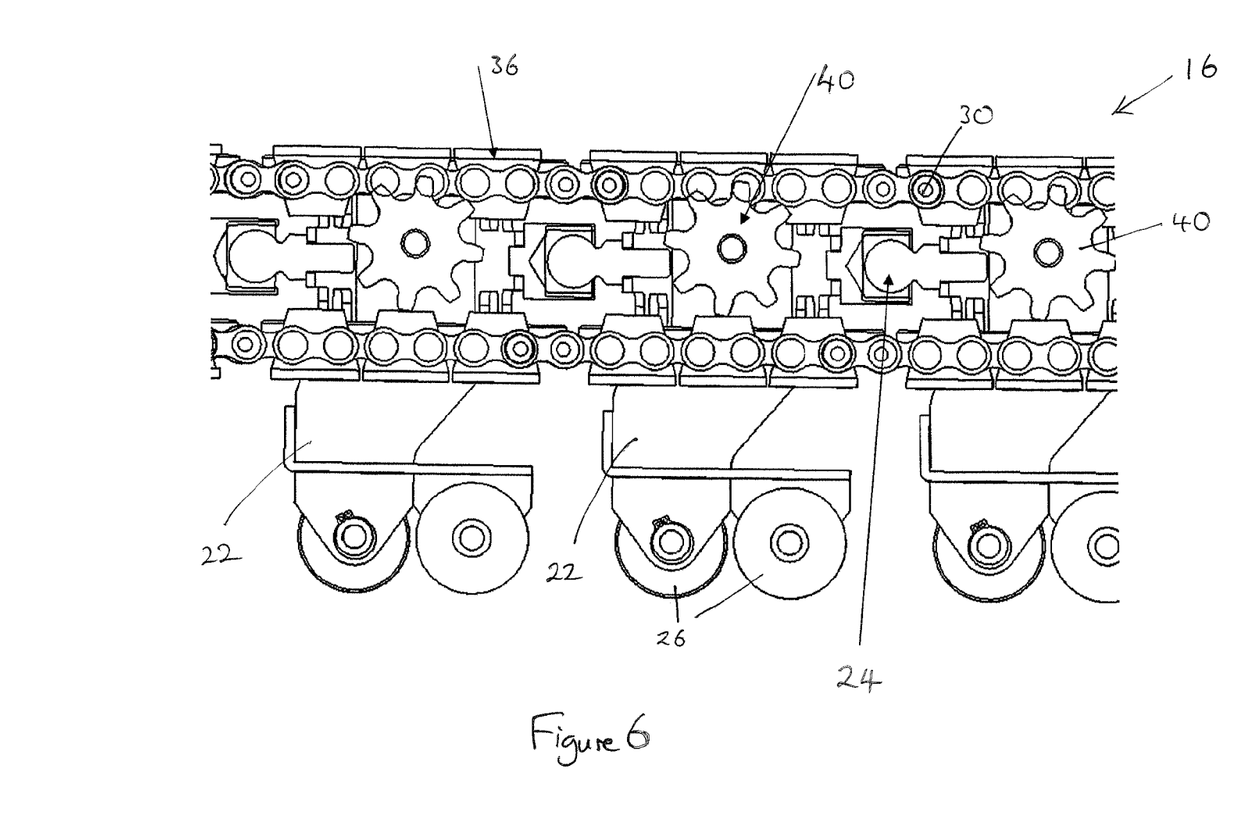
FIG. 6 is a longitudinal sectional view through the second conveyor of a conveyor apparatus according to a second embodiment of the present invention.

In the embodiment shown in FIGS. 5 and 6, each segment 22 of the second conveyor 16 includes a sprocket 40 mounted on a shaft 42 journaled in the respective segment 22 to extend transversely across the width of the segment 22, the sprocket 40 engaging the chain 30 such that the shaft is rotated by movement of the chain, a roller 44 being provided on each end of the shaft 42, the roller 44 being exposed on either side of the conveyor flights 36 to engage luggage located on the second conveyor, the rollers 44 being rotated by the drive chain 30 to move luggage along the second conveyor 16 when the chain 30 is driven by the drive motor of the second conveyor 16.

In use, the vehicle 10 is driven up to the side of an aircraft and the first conveyor 14 is raised to bring the head end of the first conveyor adjacent the opening of the cargo hold 2 of an aircraft 1 (FIG. 1). A baggage handler may then climb up the first conveyor 14 and enter a cargo hold 2 of the aircraft 1. The head section 38 of the second conveyor 16 can then be manually extended into the cargo hold 2, such as shown in FIG. 1.

Luggage can then be placed onto the belt conveyor section 38 on the head section 34 of the second conveyor and the conveyor apparatus activated to convey luggage out of the aircraft and down to the ground, where it can be removed from the belt conveyor 20 at the tail end of the first conveyor and placed into luggage carts to be transported to the terminal.

Subsequently the luggage hold 2 can be loaded by activating the first conveyor 14 and second conveyor 16 and placing luggage onto the belt conveyor 20 at the tail end of the first conveyor 14 from where it is conveyed onto the first conveyor 14 and subsequently onto the second conveyor 16 via the intermediate conveyor section 28 and into the cargo hold 2 via the second conveyor 16.

The articulation of the conveyor segments 22 of the second conveyor 16 by virtue of the joints 24 enables the path of the second conveyor 16 to be adjusted to deliver the luggage where required within the luggage hold 2. As loading progresses, the position of the head end of the second conveyor 16 can be moved and the second conveyor retracted into a housing beneath the first conveyor 14 as the luggage hold is filled. When loading is finished the second conveyor 16 can be fully retracted out of the luggage hold and the vehicle 10 can be moved away from the aircraft 1. The conveyor apparatus can be used in a similar way to unload a cargo hold 2, the second conveyor 16 being extended to a desired loading location within the hold and activated to convey luggage out of the hold 2 onto the first conveyor 14. The second motor mounted in a tail end of the second conveyor 16 may be powered to move the conveyor flights in an unloading direction.

Figure 7:
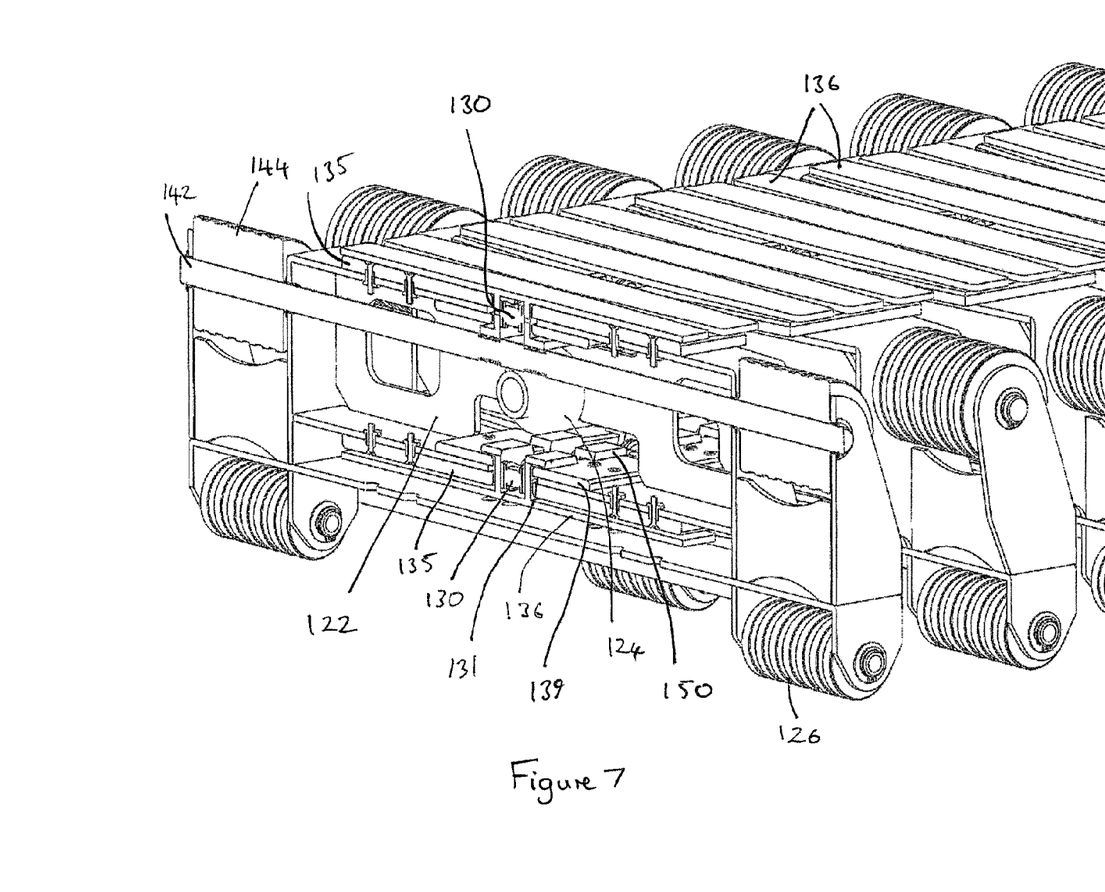
FIG. 7 is a transverse sectional view through a modified version of the second conveyor of the conveyor apparatus of FIG. 6.
Figure 8:
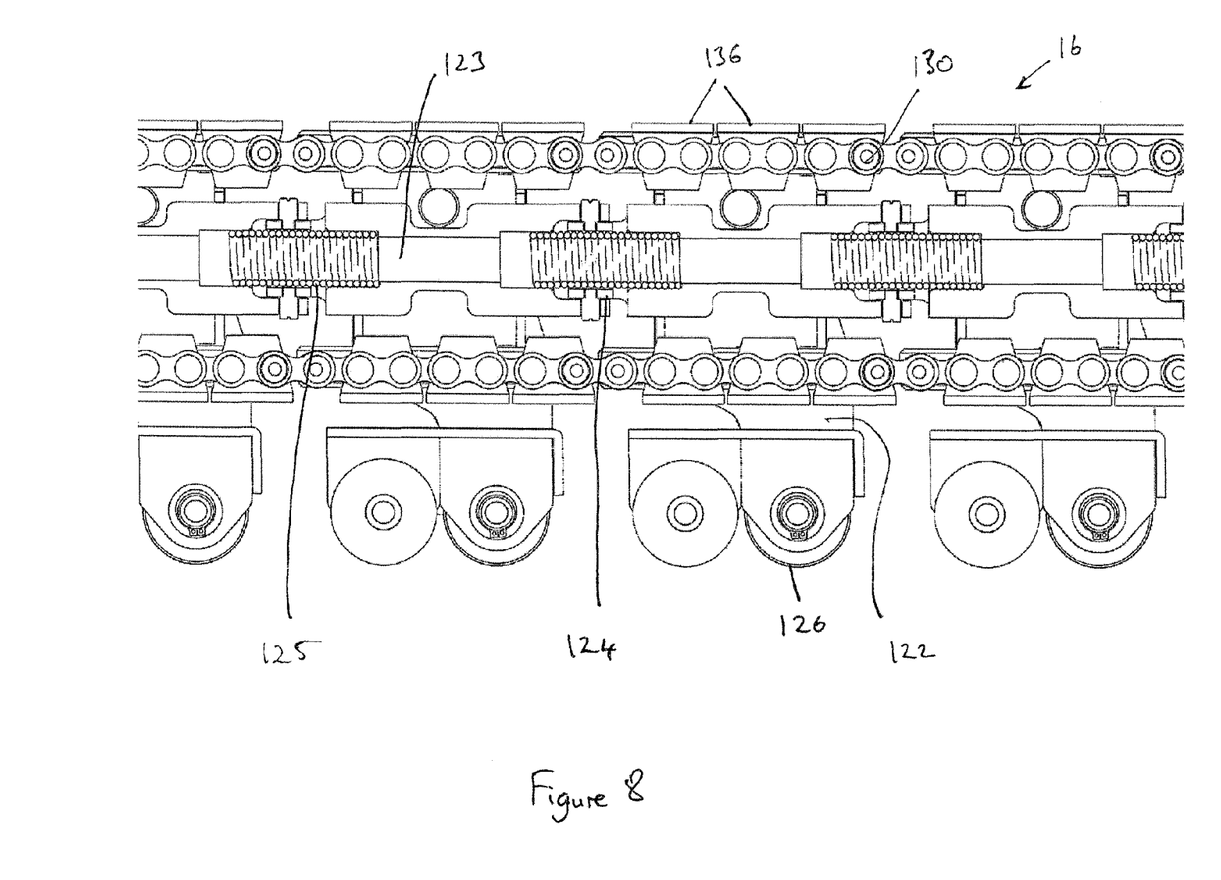
FIG. 8 is a longitudinal sectional view through the modified second conveyor of FIG. 7.

FIGS. 7 and 8 show a modified second conveyor 16 in accordance with a further embodiment of the present invention. In such embodiment the second conveyor 16 includes a plurality of mutually interconnected conveyor segments 122 connected together by means of respective universal joints, such as Cardan joints 124, whereby the conveyor segments 122 of the second conveyor 16 may be pivotally displaced sideways and upwardly and downwardly with respect to each other to adjust the conveyor path of the second conveyor 16 as required such that the head end of the second conveyor 16 is located or positionable at a position wherein the luggage conveyed therein is desired to be placed. Each segment incorporates a central bore 123, the bore of adjacent segments being linked by hollow springs 125 (FIG. 8), whereby an elongate channel is defined through the segments. Such channel may be utilised to house wiring for the transmission of power and/or for control signals, for example.

As with the first embodiment, each conveyor segment 122 is provided with support rollers 126 on the base thereof to allow the segments 122 of the second conveyor 16 to be rolled out along the floor of the cargo hold 2 of the aircraft and moved around therein as required to locate or position the head end of the second conveyor 16 at a desired location in the cargo hold. In such embodiment, the sprockets 40 are omitted and the luggage carrying rollers 144 are not driven by the endless drive chain 130, but rather and freely rotating, in a similar manner to the lower support rollers 126.

A plurality of transversely extending conveyor flights 136 are mounted on an endless chain 130 to define a moveable conveying surface. Each flight 136 includes a central portion and a pair of opposing wing portions. The sides of the wing portions are tapered from the central portion to the respective distal end thereof to provide sufficient clearance between adjacent conveyor flights to permit sideways displacement of the segments 122 of the second conveyor 16. The chain 130 and associated portions of the conveyor flights 136 are guided through channels 131 formed in each segment 122 of the second conveyor 16. The conveyor flights 136 are guided over hard wearing low friction plates 135 mounted on the segments 122, the plates being formed from a suitable hard wearing material, such as a polymeric material, such as polyethylene or nylon. Similar plates 139 may be provided for guiding lower portions 150 of the conveyor flights 136, such that the conveyor flights 136 define slots within which the sides of the channels 131 are received to retain the conveyor flights on the conveyor segments 122.

It will be appreciated that the present invention is not limited to the embodiment(s) described herein, but can be amended or modified without departing from the scope of the present invention. For example, it is envisaged that the upper rollers 44, 144 may be omitted and the width of the conveyor flights may be increased to extend over the entire width of the second conveyor 16. Furthermore, flexible and/or elastic webs or membranes may extend between the conveyor flights to link the conveyor flights into a continuous conveying surface. Alternatively the conveyor flights may overlap to prevent items from passing between the conveyor flights.

The invention claimed is:

1. A conveyor apparatus for loading and unloading aircraft, said apparatus comprising:
   a first conveyor for conveying articles from an area outside of an aircraft to an entrance to a cargo compartment of the aircraft;
   a second conveyor comprising a plurality of conveyor segments for conveying articles from an end of said first conveyor into the cargo compartment, said second conveyor having a tail end adjacent said first conveyor and a head end at a distal end of said second conveyor;
   wherein said second conveyor is telescopically extendable from said first conveyor;
   a plurality of couplers joining adjacent ones of said plurality of conveyor segments, wherein said plurality of couplers permit pivoting movement between said adjacent ones of said conveyor segments;
   an endless flexible member extending along said plurality of conveyor segments between said tail end of said second conveyor and said head end of said second conveyor, said endless member comprising at least one chosen from (i) a drive chain, (ii) a belt, and (iii) a band extending between sprockets or pulleys mounted on respective ones of said head and tail ends of said second conveyor, wherein said endless member extends along a central axis of said second conveyor coincident with said couplers; and a driver configured to drive said endless member to convey articles along said second conveyor;

wherein each of said conveyor segments includes a driven member engaging said endless member and at least one roller or wheel configured to be rotatably driven by said driven member for rotation about an axis extending transverse to said second conveyor, for conveying articles along said second conveyor.

2. A conveyor as claimed in claim 1, wherein said driver is provided on at least one end of said second conveyor.

3. A conveyor as claimed in claim 2, wherein said driver is provided at at least said head end of said second conveyor.

4. A conveyor as claimed in claim 1, wherein said driver comprises a first driver provided on said head end of said second conveyor for driving said second conveyor in a first direction, and wherein a second driver is provided at said tail end of said second conveyor for driving said second conveyer in a second direction, opposite said first direction.

5. A conveyor as claimed in claim 1, further comprising a guide on each of said conveyor segments of said second conveyor, wherein said guides are configured for guiding the path of said endless member.

6. A conveyor as claimed in claim 1, wherein each conveyor segment is provided with at least one ground engaging support wheel or roller on a lower side thereof.

7. A conveyor apparatus as claimed in claim 1, wherein said driven member comprises a sprocket.

8. A conveyor as claimed in claim 1, further comprising a plurality of conveyor flights mounted on said endless member and configured to be moved along said conveyor segments, each of said conveyor flights comprising a central portion coupled to said endless member and pair of opposing side wings extending transversely from said endless member to define a respective portion of a conveying surface.

9. A conveyor as claimed in claim 8, wherein said side wings taper from said central portion to a respective distal end thereof to permit mutual sideways pivotal movement of said conveyor segments.

10. A conveyor apparatus for loading and unloading aircraft, said apparatus comprising:

a first conveyor for conveying articles from an area outside of an aircraft to an entrance to a cargo compartment of the aircraft;

a second conveyor comprising a plurality of conveyor segments for conveying articles from an end of said first conveyor into said cargo compartment;

wherein said second conveyor is telescopically extendable from said first conveyor;

a plurality of couplers joining adjacent ones of said plurality of conveyor segments, wherein said couplers are configured to permit mutual sideways pivotal movement of adjacent ones of said conveyor segments to thereby provide an adjustable conveyor path;

a single endless member mounted at said second conveyor and configured to convey articles therealong, wherein said endless member extends along a central axis of said second conveyor coincident with said couplers;

a driven member at each of said conveyor segments, said driven member engaging said endless member; and at least one roller or wheel configured to be rotatably driven by said driven member for rotation about an axis extending transverse to said central axis of said second conveyor.

11. A conveyor apparatus as claimed in claim 10, wherein said endless member comprises an endless belt or chain.

12. A conveyor apparatus as claimed in claim 11, wherein a plurality of conveyor flights are mounted on said endless belt or chain to define a conveying surface.

* * * * *